United States Patent [19]

Shibata

[11] Patent Number: 4,931,421

[45] Date of Patent: Jun. 5, 1990

[54] CATALYST CARRIERS AND A METHOD FOR PRODUCING THE SAME

[76] Inventor: Motonobu Shibata, 18-86, Andon, Nakanosho-Cho, Inazawa City, Aichi Pref., Japan

[21] Appl. No.: 288,424

[22] Filed: Dec. 22, 1988

[30] Foreign Application Priority Data

Jun. 27, 1988 [JP] Japan .................. 63-156829
Jun. 27, 1988 [JP] Japan .................. 62-156830

[51] Int. Cl.$^5$ ............................ B01J 32/00
[52] U.S. Cl. .................... 502/439; 502/527; 428/653
[58] Field of Search .............. 502/439, 527; 428/653

[56] References Cited

U.S. PATENT DOCUMENTS

| 3,881,880 | 5/1975 | Gomersall | 428/653 |
| 3,944,504 | 3/1976 | Ford et al. | 502/527 X |
| 4,742,038 | 5/1988 | Matsumoto | 502/439 X |
| 4,752,599 | 6/1988 | Nakamura et al. | 502/527 X |

Primary Examiner—W. J. Shine
Attorney, Agent, or Firm—Arnold, White & Durkee

[57] ABSTRACT

A catalyst carrier comprises a substrate made of a material selected from a stainless steel and a nickel base alloy both at least containing 0.2 to 0.8 wt % of Ti and 0.01 to 0.5 wt % of C, and an alumina thin layer firmly bonded onto the surface of the substrate by Al-O-ti-C bonds. The catalyst carrier is shaped in the form of a porous body having gas permeability in at least one direction. The alumina thin layer may be firmly bonded by Al-O-Ti-C bonds to the surface of the substrate having an aluminum-iron alloy layer or an aluminum-nickel alloy layer. The alumina thin layer is formed by heat treating aluminum coated onto the surface of the substrate at 600° to 1,000° C. for not less than 10 minutes. Instead of coating the alumina, aluminum may be placed onto the surface of the substrate for this purpose.

21 Claims, 6 Drawing Sheets

FIG._4

FIG_5

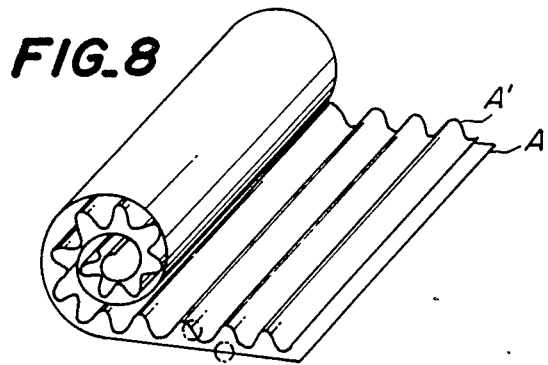
FIG_8
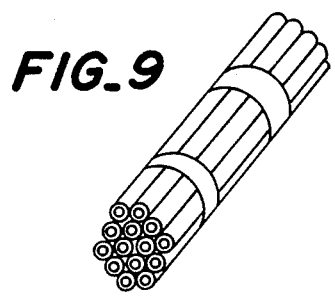
FIG_9
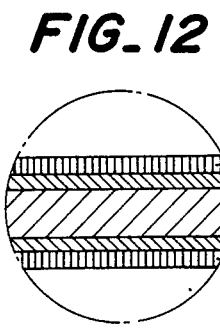
FIG_12
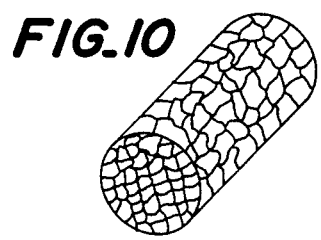
FIG_10
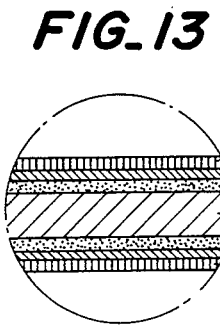
FIG_13
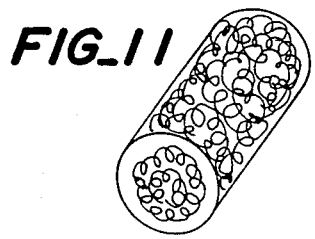
FIG_11

CATALYST CARRIERS AND A METHOD FOR PRODUCING THE SAME

BACKGROUND OF THE INVENTION (1) Field of the Invention

The present invention relates to catalyst carriers made of a metallic material (hereinafter referred to as "metallic catalyst carriers") to be used for purification catalysts to purify combustion waste gases exhausted from automobiles and factories. The invention also relates to a process for producing such catalyst carriers.

(2) Related Art Statement

Heretofore, Japanese Patent Application Laid-open No. 56-96,726 discloses a technique using, as metallic catalyst carriers, a foil made of an aluminum-containing ferrite type stainless steel in which alumina whiskers are formed on surfaces of the foil through heat treatment. According to this technique, a stainless steel which can withstand high temperatures is used, and a alumina whiskers are present on its surface. Therefore, when $\gamma\text{-}Al_2O_3$ or the like is carried on such a catalyst carrier as a wash coat, the alumina whiskers function as wedges. Thus, the wash coat layer made of $\gamma\text{-}Al_2O_3$ or the like can firmly be adhered to the metallic catalyst carrier.

However, since the ferrite type stainless steel used as the substrate contains not less than 3% by weight of aluminum, its plastic deformability is extremely deteriorated. Thus, it takes many steps to obtain a foil of the stainless steel of this kind.

SUMMARY OF THE INVENTION

It is an object of the present invention to diminish the above-mentioned problems, and to provide catalyst carriers which can firmly bond a metal substrate and an alumina thin layer as constituting members thereof and which are free from deterioration in plastic deformability.

It is a further object of the present invention to provide a process for producing such catalyst carriers.

According to a first aspect of the present invention, there is a provision of a catalyst carrier which comprises a substrate made of a stainless steel or a nickel base alloy at least containing 0.2 to 0.8% by weight (hereinafter referred to briefly as "wt %") of Ti and 0.01 to 0.5 wt % of C, and an alumina film firmly bonded to a surface of the substrate through Al-O-Ti-C bonds, wherein the catalyst carrier is formed in the form of a porous body having gas permeability at least one direction.

The process for producing such a catalyst carrier according to the present invention is characterized by the steps of obtaining a desired shape of a metal strip from a stainless steel or a nickel base alloy at least containing 0.2 to 0.8 wt % of Ti and 0.01 to 0.5 wt % of C as a substrate, coating the substrate with alumina, forming an alumina thin layer firmly bonded to the surface of the substrate via Al-O-Ti-C bonds by heat treating the thus coated substrate, and converting the alumina film-formed substrate into a given shape of the catalyst carrier of a porous body having gas permeability in at least one direction. Alternatively, the producing process according to the present invention comprises the steps of obtaining a desired shape of the stainless steel or the nickel base alloy at least containing Ti and C in the above-specified amounts, respectively, as a substrate, converting the substrate into a given shape of a catalyst carrier of a porous body having gas permeability in at least one direction, coating it with alumina, and forming an alumina thin layer firmly bonded to the surface of the catalyst substrate via Al-O-Ti-C bonds by heat treatment.

According to a second aspect of the present invention, there is a catalyst carrier which comprises a substrate made of a stainless steel or a nickel base alloy at least containing 0.2 to 0.8 wt % of Ti and 0.01 to 0.5 wt % of C, and an alumina thin layer firmly bonded to a surface of the substrate by Al-O-Ti-C bonds through an aluminum-iron alloy layer or an aluminum-nickel alloy layer, wherein the catalyst carrier is formed in the form of a porous body having gas permeability at least one direction.

The process for producing such a catalyst carrier according to the present invention is characterized by the steps of obtaining a metal strip made of a stainless steel or a nickel base alloy at least containing 0.2 to 0.8 wt % of Ti and 0.01 to 0.5 wt % of C, plating the metal strip with aluminum, cold rolling the plated metal strip, converting the rolled strip into a corrugated porous body having gas permeability in at least one direction, and forming an alumina thin layer firmly bonded onto the internal surface of the porous body of the metal strip by Al-O-Ti-C bonds through an aluminum-iron alloy layer or an alumina-nickel alloy layer by heat treating the porous body at 600° to 1,000° C. for not less than 10 minutes and consequently oxidizing the plated aluminum layer.

In the construction of the first aspect of the present invention, since Ti and C are contained in the stainless steel or the nickel base alloy as the substrate in the respectively specified amounts, the tough Al-O-Ti-C bonds can be formed at the interface through the reaction between the alumina thin layer, provided on the surface of the substrate, and TiC (titanium carbide) precipitated in the metal by the heat treatment. Consequently, the alumina thin layer can firmly be bonded to the carrier substrate by the chemical bonds. Further, the alumina thin layer which has equivalent or better performance as compared with the alumina whiskers is formed by heat treating the alumina thin layer without the addition of a certain amount of Al into the substrate for producing the alumina whiskers, unlike the prior art. Thus, the plastic deformability is undeteriorated.

In the construction of the second aspect of the present invention, since Ti and C are contained in the stainless steel or the nickel base alloy as the substrate in the respectively specific amounts, the aluminum plated onto the surface of the substrate is oxidized by heat treatment in air. Thereby, the alumina thin layer is formed on the substrate through the aluminum-iron alloy layer or the aluminum-nickel alloy layer, and reacts with TiC (titanium carbide) precipitated in the metal, so that the tough Al-O-Ti-C bonds are formed at the interface. Thus, the firm bonding between the metal substrate and the alumina thin layer can be obtained by the chemical bonding. Further, the chemically bonded alumina thin layer which has equal or more excellent performance as compared with the alumina whiskers is formed by heat treating the plated aluminum layer formed on the substrate without the addition of a certain amount of Al into the substrate for producing the alumina whiskers unlike the prior art. Thus, the plastic deformability is kept undeteriorated.

Furthermore, when the substrate is plated with aluminum, a pretreatment such as coarsening the surface of the substrate to be plated is unnecessary unlike the alumina coating. Accordingly, the production process can be simplified. In addition, since the plated aluminum layer is heat treated, the aluminum-iron alloy layer or the aluminum-nickel alloy layer is produced between the plated aluminum layer and the substrate made of the stainless steel or the Ni base alloy owing to the diffusion of aluminum into the substrate. Consequently, the alumina thin layer is firmly bonded to the surface of the substrate by the Al-O-Ti-C bonds.

These and other objects, features, and advantages of the invention will be appreciated upon reading the following description of the invention when taken in conjunction with the attached drawings, with the understanding that some modifications, variations and changes of the same could be made by one skilled in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 8 through 11 are schematic perspective views of embodiments of the catalyst carriers according to the present invention; and FIGS. 12 and 13 are schematic sectional views of parts of catalyst carriers according to the present invention.

DETAILED DESCRIPTION OF THE INVENTION

Figure 1:
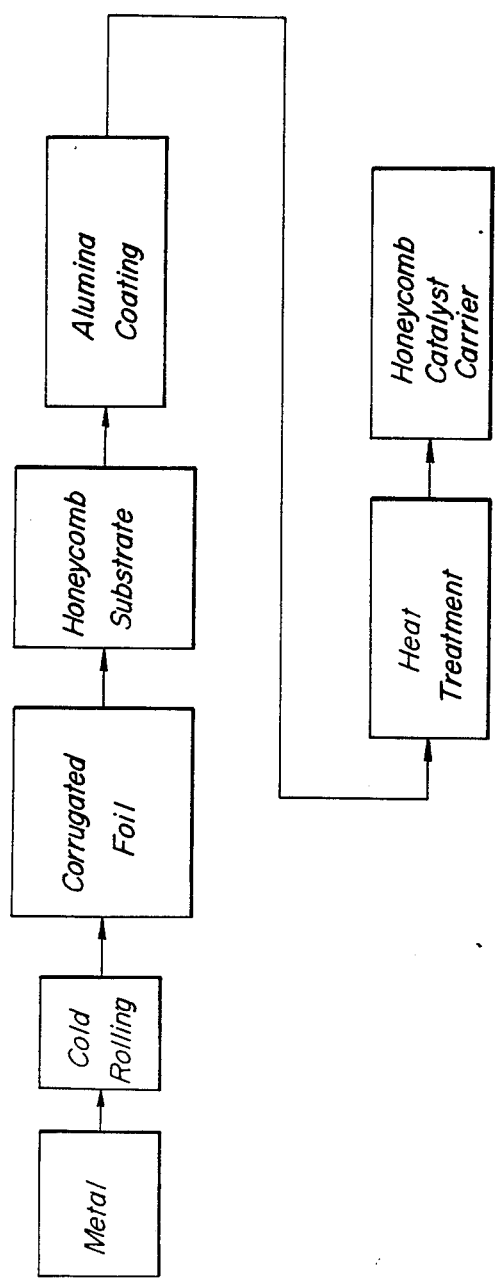
FIGS. 1 through 4 are flow charts explaining examples of the process for producing the catalyst carriers according to the first aspect of the present invention.

First, numerical limitations made in the present invention will be explained below.

The reasons for limiting the addition amounts of Ti and C are as follows:

If the content of Ti is less than 0.2 wt % or if that of C is less than 0.01 wt %, as is clear from Experiments mentioned later, the alumina thin layer peels. Thus, the respectively lower limits are imposed upon the contents of Ti and C. This peeling is considered to be caused because sufficient Al-O-Ti-C bonds are not formed due to smaller addition amounts of Ti and C. To the contrary, if the content of C exceeds 0.5 wt %, carbon precipitates in the form of graphite at the interface between the metal substrate and the alumina film layer. Consequently, the alumina film layer becomes brittle, and is likely to be peeled. Furthermore, if the content of Ti exceeds 0.8 wt %, the thickness of a TiC bonding layer increases due to repeated heat treatment. When the thickness of this layer becomes greater, the alumina thin layer is also likely to be peeled due to excessive hardness of a bonding phase. For the above reasons, Ti is limited to 0.2 to 0.8 wt %, while C is limited to 0.01 to 0.5 wt %.

The reason why the heat treating conditions are limited to a range from 600° to 1,000° C. and not less than 10 minutes in the case of the first aspect of the present invention is as follows:

If the temperature is less than 600° C., sufficient bonding strength cannot be obtained between the metal substrate and the alumina thin layer. On the other hand, if it is more than 1,000° C., the alumina thin layer is likely to be peeled because of rapid formation of the Al-O-Ti-C bonds. If the heat treating time is less than 10 minutes, the Al-O-Ti-C bonds are not sufficiently formed and improvement of the bonding strength is not attained. Therefore, the heat treating conditions are limited to the temperature range of 600° to 1,000° C. and not less than 10 minutes.

The above discussion on the limitations of the heat treating conditions is similarly applicable to the second aspect of the present invention.

That is, if the temperature is less than 600° C., it takes a long time to form the Al-O-Ti-C bonds, and sufficient bonding strength at the interface cannot be obtained. Thus, a temperature less than 600° C. is impractical. On the other hand, if the temperature is more than 1,000° C., the alumina thin layer is likely to peel because of rapid formation of the aluminum-iron alloy layer or the aluminum-nickel alloy layer. If the heat treating time is less than 10 minutes, the Al-O-Ti-C bonds are not sufficiently formed and improvement of the bonding strength is not recognized. Therefore, the heat treating conditions are limited to the temperature range from 600° to 1,000° C. and the heating time of not less than 10 minutes.

The above discussion on the limitations of the heat treating condition is similarly applicable to the second aspect of the present invention.

The reasons why the content of Cr in the stainless steel used as the substrate is limited to a range from 10 to 26 wt % as mentioned later are as follows:

If the content of Cr is less than 10 wt % in the case that C is limited to 0.12 wt %, desired tensile strength in an annealed state cannot be obtained. On the other hand, if the content of Cr is more than 26 wt %, a significant improvement of strength cannot be obtained. Thus, the content of Cr is preferably in a range from 10 to 26 wt %.

In the first aspect of the present invention, the thickness of the alumina thin layer is preferably in a range from 0.1 to 5.0 μm for the following reasons.

That is, as is seen from the experiments mentioned later, if the thickness of the alumina thin layer is more than 5.0 μm, the layer is likely to peel due to differences in thermal expansion, while if it is less than 0.1 μm, a sufficient thickness of the alumina thin layer cannot be obtained. Consequently, the alumina thin layer does not function as a primary coat for attaching the wash coat onto the substrate.

In the case of the second aspect of the present invention, the thickness of the plated aluminum layer is preferably in a range from 1 to 10 μm for the following reasons.

That is, as is seen from the experiments mentioned later, if the thickness of the plated aluminum layer exceeds 10 μm, the alumina thin layer is likely to peel due to differences in thermal expansion. On the other hand, it is very difficult to control the thickness of plated aluminum layer when thickness is less than 1 μm.

Next, preferred examples of the respective constituent features of the present invention will be explained in more detail. Unless otherwise referred to, the following discussion will be applicable to both the first and second aspects of the present invention.

(1) Substrate:

(a) As the shape of the substrate in the first aspect of the present invention, those given in Table 1 are preferably used. In the second aspect of the invention, the first row (Strip sheet) in Table 1 is preferably employed.

TABLE 1

| Shape | Use state of substrate | |
|---|---|---|
| Strip | Thickness | 0.03 to 0.50 mm |
| | Surface conditions | flat, embossed, finely corrugated, perforated, or the like |
| Pipe | Thickness | 0.03 to 0.50 mm |
| | Pipe inner diameter | 0.5 to 5.0 mm |
| Wire | Wire diameter | 0.03 to 0.50 mm |

(b) The composition range of the stainless steel (units are all "%" by weight).

TABLE 2

| Indispensable ingredients | | Elements allowed to be added (one or more kinds of additives) | | | |
|---|---|---|---|---|---|
| Ti | 0.2~0.8 | Ni | 0~30 | Si | 0~5 |
| C | 0.01~0.5 | Mn | 0~10 | Cu | 0~3 |
| Cr | 10~26 | Mo | 0~6 | Be | 0~3 |
| Fe | balance | V | 0~5 | Zr | 0~1 |
| | other than | Co | 0~5 | Y | 0~3 |
| | the above | Al | 0~3 | Ce | 0~3 |

Among the above, stainless steels having the compositions shown in Table 3 are recited as preferred.

TABLE 3

| SUS304-similar type | | | |
|---|---|---|---|
| Ti | 0.4~0.7 | C | 0.015~0.15 |
| Cr | 18~20 | Si | not more than 1.00 |
| Mn | not more than 2.00 | Ni | 9.0~13.0 |
| Fe | balance | | |
| SUS316-similar type | | | |
| Ti | 0.4~0.7 | C | 0.015~0.15 |
| Cr | 16~18 | Si | not more than 1.00 |
| Mn | not more than 2.00 | Ni | 12.0~15.0 |
| Mo | 2.0~3.0 | Fe | balance |
| SUS321-similar type | | | |
| Ti | 0.4~0.7 | C | 0.015~0.15 |
| Cr | 17~19 | Si | not more than 1.00 |
| Mn | not more than 2.00 | Ni | 9.00~13.0 |
| Fe | balance | | |
| SUS410-similar type | | | |
| Ti | 0.4~0.7 | C | 0.015~0.15 |
| Cr | 11.5~13.5 | Si | not more than 1.00 |
| Mn | not more than 1.00 | Fe | balance |
| SUS405-similar type | | | |
| Ti | 0.4~0.7 | C | 0.015~0.15 |
| Cr | 11.5~14.5 | Mn | not more than 1.00 |
| Al | 0.1~0.3 | Fe | balance |
| Other type | | | |
| Ti | 0.4~0.7 | C | 0.015~0.15 |
| Cr | 13~18 | Fe | balance |

(c) Composition range of the Ni base alloy (Units are all "%" by weight):

It is preferable that the Ni base alloy is composed of indispensable ingredients and additive elements given in the following Table 4.

TABLE 4

| Indispensable ingredients | | Elements allowed to be added (one or more kinds of additives) | | | |
|---|---|---|---|---|---|
| Ti | 0.2~0.8 | Cr + Fe + Mo | 20~65 | | |
| C | 0.01~0.5 | Mn | 0~10 | Cu | 0~3 |
| Ni | balance | Si | 0~5 | Be | 0~3 |
| | other than the above | V | 0~5 | Zr | 0~1 |
| | | Co | 0~5 | Y | 0~3 |
| | | Al | 0~3 | Ce | 0~3 |

Among the Ni base alloys, the following ones having compositions shown in Table 5 are recited as preferred.

TABLE 5

| Ni—Cr—Fe type | | | |
|---|---|---|---|
| Ti | 0.4~0.7 | C | 0.015~0.15 |
| Cr | 15~23 | Fe | 8~15 |
| Si | not more than 1.00 | Mn | not more than 1.00 |
| Al | not more than 1.50 | Ni | balance |
| Ni—Cr type | | | |
| Ti | 0.4~0.7 | C | 0.015~0.15 |
| Cr | 48~62 | Si | not more than 1.00 |
| Mn | not more than 1.00 | Fe | 9.0~13.0 |
| Ni | balance | | |
| Ni—Mo type | | | |
| Ti | 0.4~0.7 | C | 0.015~0.15 |
| Cr | not more than 1.00 | Si | not more than 1.00 |
| Mn | not more than 1.00 | Fe | 3.0~6.0 |
| Mo | 26~30 | Ni | balance |
| Ni—Cr—Mo type | | | |
| Ti | 0.4~0.7 | C | 0.015~0.15 |
| Cr | 14.5~16.5 | Si | not more than 1.00 |
| Mn | not more than 1.00 | Fe | 4.0~7.0 |
| Co | not more than 2.5 | Mo | 15~18 |
| Ni | balance | | |
| Ni—C—Ti type | | | |
| Ti | 0.4~0.7 | C | 0.015~0.15 |
| Ni | balance | | |

(2) Shape of the porous body:

As given in the following Table 6, preferred shapes of the porous bodies for the substrates are present in the first aspect of the present invention. In the case of the second aspect of the present invention, the first row ("Strip") is preferably employed.

TABLE 6

| Substrate | Shape of porous body |
|---|---|
| Strip | A porous body is shaped by corrugating a thin strip of 0.03 to 0.50 mm in thickness and shaping it to form numerous through holes in an axial direction. |
| | A porous body is shaped by preliminarily embossing, perforating, or finely corrugating a thin strip of 0.03 to 0.50 mm in thickness, further corrugating and shaping it to form numerous through holes in an axial direction. |
| Pipe | A porous body is shaped by bundling pipe-like substrates (0.03–0.50 mm thickness and 0.5–5.0 mm in diameter). |
| Wire | A gas permeable porous body is formed from a metallic knit in which metal wires of 0.03–0.50 mm in diameter are knitted as fibers. |
| | A gas permeable porous body is formed by twisting metal wires of 0.030–0.50 mm in diameter. |

(3) Alumina thin layer:

The alumina thin layer is mainly composed of not less than 60 wt % of alumina, and as is clear from the experiments mentioned later, the thickness thereof is preferably in a range from 0.1 to 5.0 μm.

The alumina thin layer may be formed by coating an alumina slurry onto the substrate by dipping or spraying it with an alumina colloidal solution, an aluminum alkoxide solution, or an alumina suspension liquid, drying the coated substrate at 150° to 400° C. for not less than 30 minutes, and then heat treating the dried substrate at 600° to 1,000° C. for not less than 10 minutes as specified above.

(4) Al-O-Ti-C bonding layer:

After the specified heat treatment, the Al-O-Ti-C bonding layer having a thickness of not more than 0.5 μm is present at the interface between the metal substrate and the alumina film. This is because Ti atoms in the metal substrate are diffused into a surface layer by heating to form TiC, Ti atoms in the metal substrate are bonded to O atoms in the alumina to form the Al-O-Ti-C bond, and firm chemical bonding is formed.

(5) Plated aluminum layer:

The plated aluminum layer is mainly composed of not less than 80 wt % of aluminum. As is clear from the experiments mentioned later, its thickness is in a range from 1 to 10 μm.

The plated aluminum layer may be formed by a conventional technique such as a hot dipping in a molten aluminum bath.

The first aspect of the present invention will now be explained in more detail.

As mentioned above, the Al-O-Ti-C bonds in the present invention may be obtained by coating the surface of the substrate having the specified composition and made of the stainless steel or the nickel base alloy at least containing 0.2 to 0.8 wt % of Ti and 0.01 to 0.5 wt % of C with alumina, and heat treating the thus coated substrate at 600° to 1,000° C. for not less than 10 minutes. The following four processes are advantageously employed for practically producing products.

FIGS. 1 through 4 are flow charts showing examples of the production process for producing the catalyst carriers according to the first aspect of the present invention. In the flow chart of FIG. 1, a corrugated honeycomb carrier is produced from a metal strip. First, the metal strip having a given composition is prepared. The metal strip may be produced by using a conventional technique such as cold rolling. Next, the metal strip is converted to a corrugated foil. The corrugated foil is piled upon a flat metal strip, which is then coiled to form a honeycomb substrate. The thus obtained honeycomb substrate is coated with alumina under desired conditions, and then heat treated under the above-mentioned conditions to form an Al-O-Ti-C bonding at an interface between the metal substrate and the alumina film layer. Thereby, a honeycomb catalyst carrier having gas permeability in at least one direction is obtained.

Figure 2:
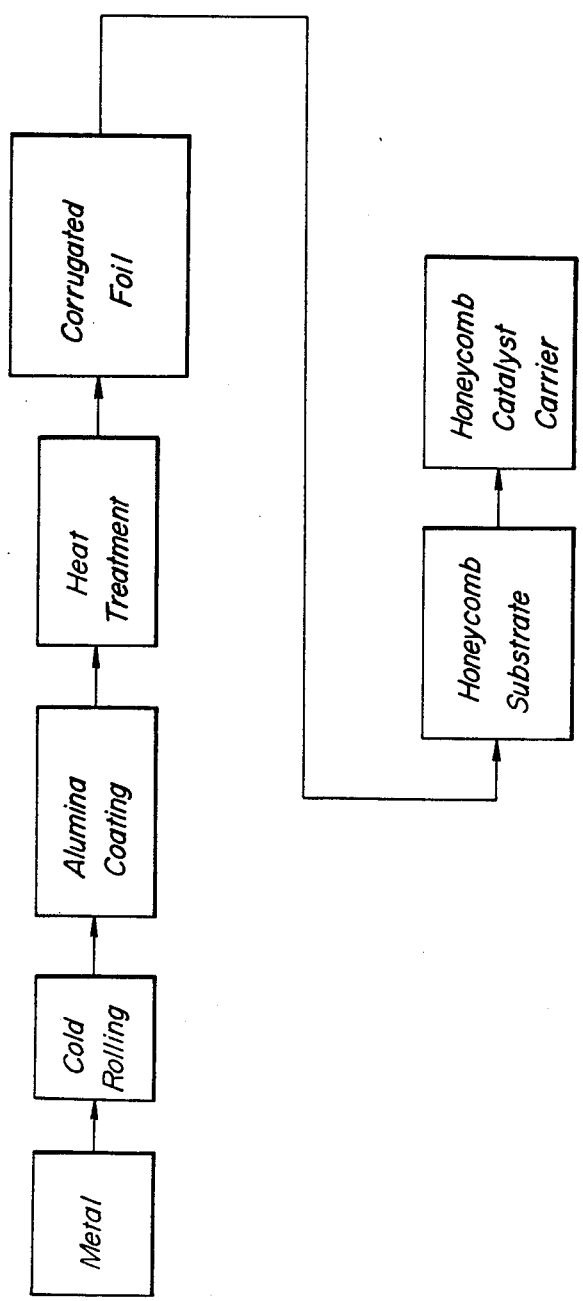

The flow chart of FIG. 2 shows a modification of the process in FIG. 1 for producing the catalyst carrier from a metal strip. In FIG. 2, after the metal strip is similarly prepared, the strip is subjected first to coating with alumina and then to the above-mentioned heat treatment, thereby forming Al-O-Ti-C bonding. Next, the thus treated strip is converted to a corrugated foil, and a honeycomb catalyst carrier having gas permeability in at least one direction is obtained as a honeycomb substrate in the same manner as in FIG. 1. In this process, the alumina coating step is simplified and the productivity is improved as compared with the process illustrated in the flow chart of FIG. 1. FIG. 8 illustrates the above production process, and FIG. 12 schematically shows a side portions of the foils encircled in FIG. 8. In FIG. 8, A and A' denote the flat and corrugated foils, respectively. In FIG. 12, reference numerals 1, 2 and 3 denote a stainless steel or nickel base alloy, an alumina thin layer, and an Al-O-Ti-C bonding, respectively.

Figure 3:
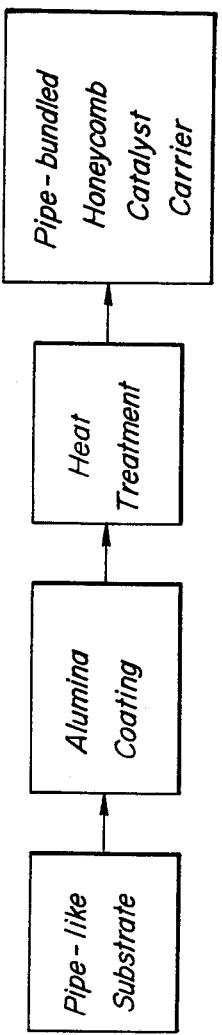

The flow chart of FIG. 3 illustrates a process for producing a honeycomb catalyst carrier from pipe-like substrates. First, the pipe-like substrates having a given composition are prepared. The pipe-like substrates may be produced by using a conventional technique. Next, the entire inner and outer surfaces of each of the pipe-like substrates are coated with alumina, and the pipe is heated under specific conditions to form an Al-O-Ti-C bonding at the interface between the pipe-like substrate and the alumina film layer. Finally, a honeycomb catalyst carrier having gas permeability in at least one direction is obtained by bundling the heat treated pipe-like substrates together. With respect to this process, a modified process may be employed. That is, pipe-like substrates are first bundled together, coated with alumina, and then heat treated under given conditions, thereby obtaining a honeycomb catalyst carrier. FIG. 9 illustrates such a honeycomb catalyst carrier. This catalyst carrier also has the layer structure as shown in FIG. 12 with respect to the constituting pipes.

Figure 4:
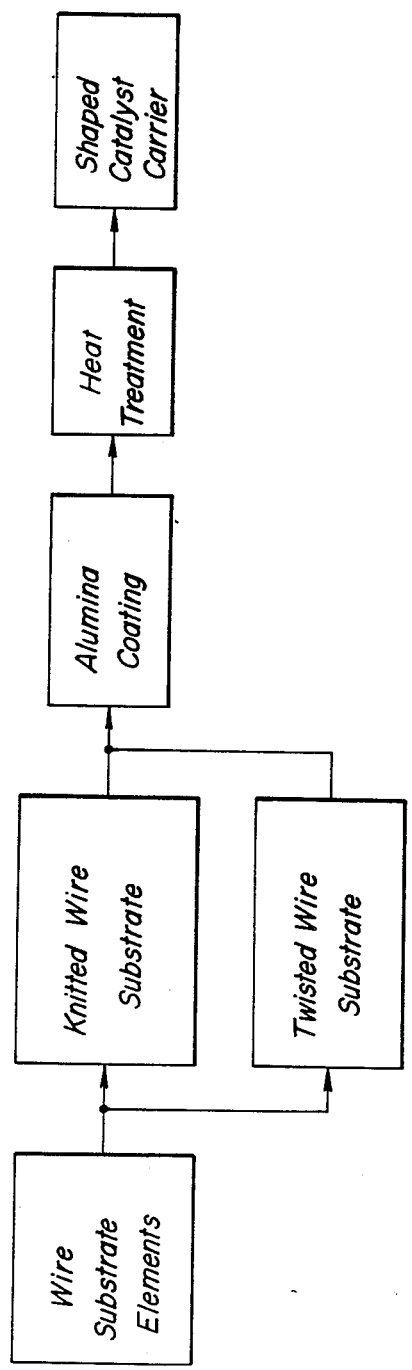

The flow chart of FIG. 4 illustrates a process for producing a porous body having a given configuration from wire substrates. First, the wire substrates having a given composition are prepared. The wire substrates may be produced by a conventional technique. Then, the wire substrates are knitted to form a knitted substrate, or they are twisted to form a combined wire substrate. The knitted substrate or the combined wire substrate is formed in a given shape. Thus, a catalyst carrier having gas permeability in at least one direction is obtained in the form of a porous body in the same manner as in the afore-mentioned processes. FIGS. 10 and 11 illustrate such honeycomb catalyst carriers. The wire substrates of the honeycomb catalyst carriers also have the layer structure as shown in FIG. 12.

In the following, with respect to the bonding between the substrate and the alumina thin layer in the first aspect of the present invention, actual examples will be explained.

EXPERIMENTS

In order to prepare a metal strip for substrates, an ingot was prepared by melting a stainless steel or an Ni base alloy formulated at a given composition shown in Tables 7 and 8 in a vacuum melting furnace. The obtained ingot having the given composition was subjected to hot rolling, and then repeatedly to cold rolling and annealing, thereby obtaining a metal strip of about 0.5 mm in thickness. The metal strip was cut into square test substrates having 100 mm long sides as test pieces.

Then, an alumina film was coated onto each of the test substrates in the following procedures. First, a coating solution was prepared by dissolving aluminum isopropoxide into hot water (not less than 75° C.) and adjusting the resulting solution to weakly acidic with nitric acid. Then, the metal substrate was preliminarily treated in a mixed acid solution containing 10% of nitric acid and 2% of fluoric acid for 10 minutes, and then washed with water. The preliminarily treated metal substrate was dipped into the above-prepared coating solution for effecting the coating. With respect to all the test substrates, the thickness of the coat was adjusted to 3 μm by controlling the pulling speed and the number of dipping times. Finally, the coated metal substrate was dried in an electric furnace by heating it at a heating rate of 2.5° C./min, and then by maintaining it at 350° C. for 30 minutes.

Thereafter, the substrates on which the alumina film layer was coated were heat treated. In the heat treatment, Al-O-Ti-C bonds were formed by heating the substrates at 900° C. in the electric furnace for 15 minutes, thereby obtaining test pieces.

In order to evaluate characteristics, the thus obtained test pieces were subjected to thermal shock tests through cooling and heating by using a device for putting them into the electric furnace at 900° C. in air and extracting them therefrom. The test cycling was 500 cycles between 900° C. for 15 minutes in air and room temperature for 45 minutes. The surface state of the test pieces was observed by naked eyes. With respect to the catalyst carriers using the stainless steel and the Ni base alloy, results are given in Tables 7 and 8, respectively.

TABLE 7

| No. | Composition (wt %) Ti | C | Other ingredient | | Thickness of alumina film | Surface state after thermal shock test |
|---|---|---|---|---|---|---|
| 1 | 0.002 | 0.038 | Cr | 19.0 | 3 μm | partially peeled |
| 2 | 0.100 | 0.040 | Si | 0.03 | | partially peeled |
| 3 | 0.240 | 0.040 | Mo | 1.00 | | no abnormality |
| 4 | 0.580 | 0.042 | Ni | 11.0 | | no abnormality |
| 5 | 0.760 | 0.038 | Fe | balance | | no abnormality |
| 6 | 1.000 | 0.040 | | | | partially peeled |
| 7 | 1.300 | 0.042 | | | | partially peeled |
| 8 | 0.600 | 0.005 | | | | partially peeled |
| 9 | 0.620 | 0.018 | | | | no abnormality |
| 10 | 0.600 | 0.460 | | | | no abnormality |
| 11 | 0.580 | 0.600 | | | | partially peeled |
| 12 | 0.003 | 0.040 | Cr | 17.0 | 3 μm | partially peeled |
| 13 | 0.120 | 0.042 | Si | 0.02 | | partially peeled |
| 14 | 0.400 | 0.042 | Mn | 1.0 | | no abnormality |
| 15 | 0.550 | 0.038 | Ni | 13.0 | | no abnormality |
| 16 | 0.650 | 0.040 | Mo | 2.5 | | no abnormality |
| 17 | 1.000 | 0.042 | Fe | balance | | partially peeled |
| 18 | 1.200 | 0.042 | | | | partially peeled |
| 19 | 0.580 | 0.005 | | | | partially peeled |
| 20 | 0.600 | 0.019 | | | | no abnormality |
| 21 | 0.600 | 0.350 | | | | no abnormality |
| 22 | 0.580 | 0.550 | | | | partially peeled |
| 23 | 0.003 | 0.038 | Cr | 18.0 | 3 μm | partially peeled |
| 24 | 0.098 | 0.038 | Si | 0.05 | | partially peeled |
| 25 | 0.240 | 0.042 | Mn | 0.5 | | no abnormality |
| 26 | 0.570 | 0.042 | Ni | 11.0 | | no abnormality |
| 27 | 0.770 | 0.038 | Fe | balance | | no abnormality |
| 28 | 1.000 | 0.040 | | | | partially peeled |
| 29 | 1.300 | 0.044 | | | | partially peeled |
| 30 | 0.620 | 0.003 | | | | partially peeled |
| 31 | 0.600 | 0.017 | | | | no abnormality |
| 32 | 0.580 | 0.450 | | | | no abnormality |
| 33 | 0.580 | 0.700 | | | | partially peeled |
| 34 | 0.005 | 0.040 | Cr | 12.5 | 3 μm | partially peeled |
| 35 | 0.130 | 0.042 | Si | 0.05 | | partially peeled |
| 36 | 0.380 | 0.038 | Mn | 1.00 | | no abnormality |
| 37 | 0.580 | 0.040 | Fe | balance | | no abnormality |
| 38 | 0.780 | 0.040 | | | | no abnormality |
| 39 | 1.050 | 0.038 | | | | partially peeled |
| 40 | 1.250 | 0.042 | | | | partially peeled |
| 41 | 0.620 | 0.003 | | | | partially peeled |
| 42 | 0.620 | 0.020 | | | | no abnormality |
| 43 | 0.580 | 0.390 | | | | no abnormality |
| 44 | 0.620 | 0.570 | | | | partially peeled |
| 45 | 0.004 | 0.042 | Cr | 15.0 | 3 μm | partially peeled |
| 46 | 0.098 | 0.040 | Fe | balance | | partially peeled |
| 47 | 0.230 | 0.042 | | | | no abnormality |
| 48 | 0.570 | 0.038 | | | | no abnormality |
| 49 | 0.770 | 0.040 | | | | no abnormality |
| 50 | 0.880 | 0.040 | | | | partially peeled |
| 51 | 1.400 | 0.038 | | | | partially peeled |
| 52 | 0.600 | 0.003 | | | | partially peeled |
| 53 | 0.620 | 0.018 | | | | no abnormality |
| 54 | 0.620 | 0.480 | | | | no abnormality |

TABLE 7-continued

| No. | Composition (wt %) Ti | C | Other ingredient | | Thickness of alumina film | Surface state after thermal shock test |
|---|---|---|---|---|---|---|
| 55 | 0.580 | 0.620 | | | | partially peeled |

TABLE 8

| No. | Composition (wt %) Ti | C | Other ingredient | | Thickness of alumina film | Surface state after thermal shock test |
|---|---|---|---|---|---|---|
| 1 | 0.004 | 0.040 | Cr | 18.0 | 3 μm | partially peeled |
| 2 | 0.170 | 0.040 | Fe | 11.0 | | partially peeled |
| 3 | 0.280 | 0.042 | Si | 0.05 | | no abnormality |
| 4 | 0.600 | 0.042 | Mn | 0.5 | | no abnormality |
| 5 | 0.770 | 0.040 | Al | 1.0 | | no abnormality |
| 6 | 1.030 | 0.042 | Ni | balance | | partially peeled |
| 7 | 1.500 | 0.040 | | | | partially peeled |
| 8 | 0.580 | 0.003 | | | | partially peeled |
| 9 | 0.580 | 0.020 | | | | no abnormality |
| 10 | 0.660 | 0.450 | | | | no abnormality |
| 11 | 0.620 | 0.580 | | | | partially peeled |
| 12 | 0.003 | 0.040 | Cr | 52.0 | 3 μm | partially peeled |
| 13 | 0.170 | 0.038 | Si | 0.03 | | partially peeled |
| 14 | 0.250 | 0.040 | Mn | 0.08 | | no abnormality |
| 15 | 0.570 | 0.038 | Fe | 11.0 | | no abnormality |
| 16 | 0.800 | 0.042 | Ni | balance | | no abnormality |
| 17 | 1.100 | 0.042 | | | | partially peeled |
| 18 | 1.500 | 0.044 | | | | partially peeled |
| 19 | 0.600 | 0.005 | | | | partially peeled |
| 20 | 0.620 | 0.018 | | | | no abnormality |
| 21 | 0.580 | 0.400 | | | | no abnormality |
| 22 | 0.600 | 0.600 | | | | partially peeled |
| 23 | 0.005 | 0.038 | Cr | 0.05 | 3 μm | partially peeled |
| 24 | 0.170 | 0.040 | Si | 0.03 | | partially peeled |
| 25 | 0.280 | 0.040 | Mn | 0.5 | | no abnormality |
| 26 | 0.600 | 0.042 | Fe | 5.0 | | no abnormality |
| 27 | 0.770 | 0.040 | Mo | 28.0 | | no abnormality |
| 28 | 1.030 | 0.042 | Ni | balance | | partially peeled |
| 29 | 1.500 | 0.040 | | | | partially peeled |
| 30 | 0.600 | 0.005 | | | | partially peeled |
| 31 | 0.620 | 0.018 | | | | no abnormality |
| 32 | 0.660 | 0.450 | | | | no abnormality |
| 33 | 0.620 | 0.580 | | | | partially peeled |
| 34 | 0.003 | 0.040 | Cr | 15.0 | 3 μm | partially peeled |
| 35 | 0.170 | 0.038 | Si | 0.05 | | partially peeled |
| 36 | 0.250 | 0.040 | Mn | 0.05 | | no abnormality |
| 37 | 0.580 | 0.040 | Fe | 6.0 | | no abnormality |
| 38 | 0.800 | 0.030 | Co | 0.5 | | no abnormality |
| 39 | 1.100 | 0.042 | Mo | 17.0 | | partially peeled |
| 40 | 1.500 | 0.040 | Ni | balance | | partially peeled |
| 41 | 0.600 | 0.003 | | | | partially peeled |
| 42 | 0.620 | 0.018 | | | | no abnormality |
| 43 | 0.620 | 0.400 | | | | no abnormality |
| 44 | 0.600 | 0.580 | | | | partially peeled |
| 45 | 0.003 | 0.042 | Ni | balance | 3 μm | partially peeled |
| 46 | 0.160 | 0.042 | | | | partially peeled |
| 47 | 0.270 | 0.040 | | | | no abnormality |
| 48 | 0.580 | 0.040 | | | | no abnormality |
| 49 | 0.750 | 0.042 | | | | no abnormality |
| 50 | 1.010 | 0.038 | | | | partially peeled |
| 51 | 1.300 | 0.042 | | | | partially peeled |
| 52 | 0.600 | 0.003 | | | | partially peeled |
| 53 | 0.620 | 0.020 | | | | no abnormality |
| 54 | 0.580 | 0.390 | | | | no abnormality |
| 55 | 0.620 | 0.600 | | | | partially peeled |

It is seen from Tables 7 and 8 that the test substrates satisfying the composition ranges of Ti and C in the present invention exhibited no abnormality in the thermal shock tests, while the alumina thin layer was partially peeled when the composition ranges of Ti and C of the present invention were not satisfied.

Then, with respect to the substrates made of the stainless steel and the Ni base alloy satisfying the compositional ranges in the present invention, respectively, thermal shock tests were similarly conducted while the thickness of the alumina film layer was varied. Results are shown in Table 9.

TABLE 9

| No. | Thickness of alumina film (μm) | Composition (wt %) | Surface state after thermal shock test |
|---|---|---|---|
| 1 | 0.02 | Ti: 0.580 | no abnormality |
| 2 | 0.10 | C: 0.042 | no abnormality |
| 3 | 0.50 | Cr: 19.0 | no abnormality |
| 4 | 3.0 | Si: 0.03 | no abnormality |
| 5 | 3.0 | Mn: 1.00 | no abnormality |
| 6 | 5.0 | Ni: 11.0 | no abnormality |
| 7 | 8.0 | Fe: balance | partially peeled |
| 8 | 12.0 |  | partially peeled |
| 9 | 0.03 | Ti: 0.600 | no abnormality |
| 10 | 0.12 | C: 0.042 | no abnormality |
| 11 | 0.80 | Cr: 18.0 | no abnormality |
| 12 | 1.8 | Fe: 11.0 | no abnormality |
| 13 | 3.0 | Si: 0.05 | no abnormality |
| 14 | 4.8 | Mn: 0.5 | no abnormality |
| 15 | 8.0 | Al: 1.0 | partially peeled |
| 16 | 13.0 | Ni: balance | partially peeled |

It is seen from the results in Table 9 that the thickness is preferably not more than 5.0 μm.

Furthermore, substrates made of the stainless steel and the Ni base alloy satisfying the composition ranges in the present invention among the above-mentioned ones were heated in a temperature range of 500° to 1,000° C. for various time periods, and were subjected to lattice-cut tests according to JIS K 5400. Then, their adhesion states were checked. In the tests, the thickness of the alumina coating layer was adjusted to 3 μm for all the substrates. Results are shown in Table 10 given later.

Among the above test substrate, the substrate made of a stainless steel having a composition of 0.580 wt % of Ti, 0.042 wt % of C, 19.0 wt % of Cr, 0.03 wt % of Si, 1.00 wt % of Mo, 11.0 wt % of Ni, and the balance being Fe was coated with alumina in a thickness of 3 μm, and heated at 900° C. for 10 minutes. When analyzed by Auger electron spectrography, the thus treated substrate exhibited a composition distribution shown in FIG. 5 where concentrations of Ti and C were high at the interface. This shows that Al-O-Ti-C bonds are formed there.

Figure 5:
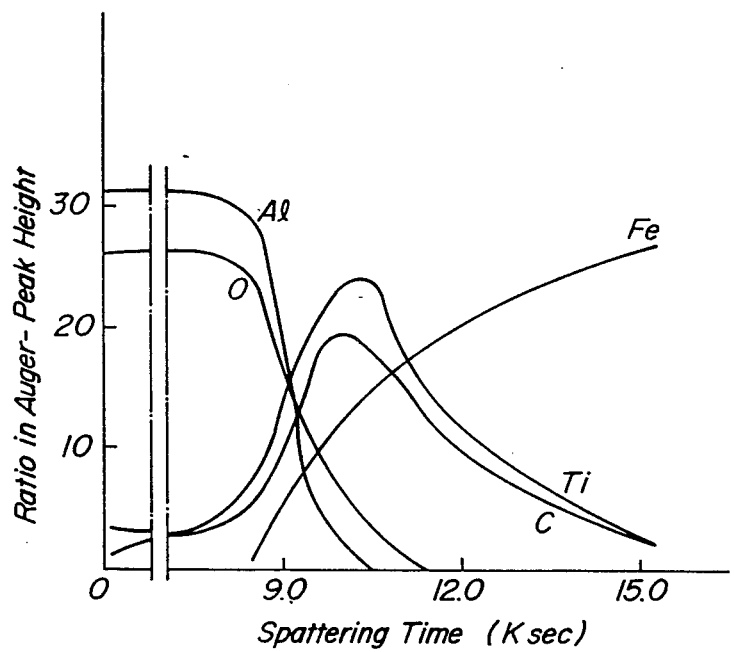
FIG. 5 is a diagram showing results of catalyst carriers according to the first aspect of the present invention in Auger electron spectrography.

That is, the ordinate and the abscissa in FIG. 5 denote the Auger peak height on the Y-axis, which corresponds to the concentration, and the spattering time period on the X-axis, which corresponds to the depth, respectively. Although the alumina and the stainless steel are clearly separated at the interface therebetween when the substrates have undergone the heat treatment, it is evident in FIG. 5 that Ti and C concentrated at the interface and partially entered and diffused into the alumina film in the case of the substrates having undergone the heat treatment at 900° C. for 10 minutes.

The state of Ti distributed is in conformity with that of C, which shows the formation of TiC. It was also confirmed by an X-ray electrospectroscopy that Ti and C concentrated in the interface were present in the form of TiC.

TABLE 10

| No. | Heat treating temperature (°C.) | Heat treating time | Lattice-cut test | Composition employed |
|---|---|---|---|---|
| 1 | 500 | 1 hr. | partially peeled | Ti: 0.580 |

TABLE 10-continued

| No. | Heat treating temperature (°C.) | Heat treating time | Lattice-cut test | Composition employed |
|---|---|---|---|---|
| 2 | 550 | 1 hr. | partially peeled | C: 0.042 |
| 3 | 600 | 5 min. | partially peeled | Cr: 19.0 |
| 4 | 600 | 10 min. | not peeled | Si: 0.03 |
| 5 | 600 | 1 hr. | not peeled | Mo: 1.0 |
| 6 | 700 | 10 min. | not peeled | Ni: 11.0 |
| 7 | 800 | 10 min. | not peeled | Fe: balance |
| 8 | 900 | 10 min. | not peeled |  |
| 9 | 1,000 | 10 min. | not peeled |  |
| 10 | 1,000 | 1 hr. | not peeled |  |
| 11 | 1,100 | 10 min. | partially peeled |  |
| 12 | 500 | 1 hr. | partially peeled | Ti: 0.600 |
| 13 | 550 | 1 hr. | partially peeled | C: 0.042 |
| 14 | 600 | 5 min. | partially peeled | Cr: 18.0 |
| 15 | 600 | 10 min. | not peeled | Fe: 11.0 |
| 16 | 600 | 1 hr. | not peeled | Si: 0.05 |
| 17 | 700 | 10 min. | not peeled | Mn: 0.5 |
| 18 | 800 | 10 min. | not peeled | Al: 1.0 |
| 19 | 900 | 10 min. | not peeled | Ni: balance |
| 20 | 1,000 | 10 min. | not peeled |  |
| 21 | 1,000 | 1 hr. | not peeled |  |
| 22 | 1,100 | 10 min. | partially peeled |  |

As is clear from the foregoing explanation, according to the catalyst carrier and the production process therefor in the first aspect of the present invention, since the specified amounts of Ti and C are contained in the metal substrate, chemically strong Al-O-Ti-C bonding is formed between the metal substrate and the alumina thin layer. Thus, the alumina thin layer can firmly be bonded to the substrate. Further, the alumina thin layer having equal or higher strength as compared with the alumina whiskers is produced by heating and oxidizing the alumina coating layer without the addition of Al in the substrate for producing the aluminum whiskers. Therefore, the catalyst carrier, which has gas permeability in at least one given direction and which is useful to purify a variety of combustion waste gases, can be obtained without deteriorating the plastic deformability.

Next, the second aspect of the present invention will be explained in more detail.

As mentioned above, the Al-O-Ti-C bonds in the present invention will be obtained by plating the surface of the substrate having the specified composition and made of the stainless steel or the nickel base alloy at least containing 0.2 wt % to 0.8 wt % of Ti and 0.01 to 0.5 wt % of C with aluminum, and heat treating the thus coated substrate at 600° to 1,000° C. for 10 minutes so that the plated aluminum is oxidized to form alumina and that the Al-O-Ti-C bonds are formed through the aluminum-iron alloy layer or the aluminum-nickel alloy layer. However, the following process is advantageously employed for practically producing products.

Figure 6:
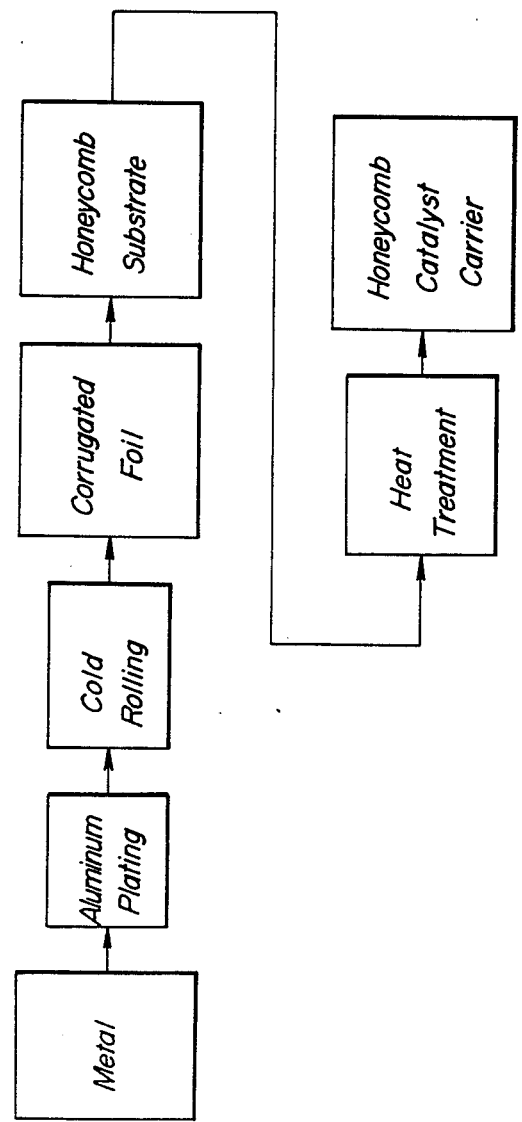
FIG. 6 is a flow chart illustrating an example of the process for producing the catalyst carriers according to the second aspect of the present invention.

FIG. 6 shows a flow chart of an example of the process for producing the catalyst carriers according to the second aspect of the present invention. In the flow chart of FIG. 6, a corrugated honeycomb carrier is produced from a metal strip. First, the metal strip having a given composition is prepared. The metal strip may be produced by using a conventional technique such as rolling. Next, the surface of the thus obtained metal strip is plated with aluminum in a given thickness, and the plated substrate is cold rolled to obtain a metal foil. The obtained metal foil is converted to a corrugated foil, and piled upon a flat metal foil, which is then coiled to obtain a honeycomb substrate as shown in FIG. 8. The honeycomb substrate is heated under given conditions, so that the plated aluminum layer is converted to an alumina thin layer and aluminum-iron or aluminum-nickel alloy layer, and that the Al-O-Ti-C bonding is formed at the interface between the metal substrate and the alumina thin layer. Thereby, a honeycomb catalyst carrier which contains an aluminum-iron alloy layer or an aluminum-nickel alloy layer and which has gas permeability in at least one direction is obtained. FIG. 13 schematically illustrates a side portion of the foil in which reference numerals 1, 2, 3 and 4 denote a stainless steel or nickel base alloy, an alumina thin layer, an Al-O-Ti-C bonding, and an aluminum-iron-alloy layer or aluminum-nickel alloy layer, respectively.

In the following, with respect to the bonding between the substrate and the alumina thin layer, actual examples will be explained.

EXPERIMENTS

In order to prepare a metal strip for substrates, an ingot was prepared by melting a stainless steel or an Ni base alloy formulated at a given composition shown in Tables 7 and 8 in a vacuum melting furnace. The obtained ingot having the given composition was subjected to hot rolling, and then repeatedly to cold rolling and annealing, thereby obtaining a metal strip of about 1 mm in thickness. The metal strip was cut into test substrates of 100×500 mm.

Then, each of the test substrates was plated with aluminum in the following procedures. First, aluminum alloy containing 8 wt % of Si was prepared for hot dipping in a molten aluminum bath. Then, the metal substrate was preliminarily cleaned with a mixed acid solution containing 10 wt % of nitric acid and 2 wt % of fluoric acid for about 10 minutes, and washed with water. The preliminarily cleaned metal substrate was dipped into the molten aluminum bath prepared above, and an amount of aluminum attached was adjusted by gas wiping. The thickness of the plated layer was further adjusted by rolling the hot-dipped substrate. The substrate was cut into square test substrates having 100 mm long sides. The thickness of the plated layer was 5 μm for all the test substrates.

Thereafter, the test substrate on which the plated aluminum layer was formed was heat treated. The heat treatment was carried out by heating the plated test substrate in an electric furnace at 800° C. for 30 minutes in air.

The characteristics of the test substrates were evaluated by the heat cycling test in the same manner as in the experiments for the first aspect of the present invention. Obtained results were the same as those given in Tables 7 and 8.

It is seen from Tables 7 and 8 that the test substrates satisfying the composition ranges of Ti and C in the present invention exhibited no abnormality in the thermal shock tests, while the alumina thin layer was partially peeled in the case of the test substrates not satisfying the composition ranges of the present invention.

Then, among the above test pieces, those made of the stainless steel and the Ni base alloy satisfying the composition ranges in the present invention were subjected to thermal shock tests, while the thickness of the alumina thin layer was varied. Results obtained are shown in Table 11.

TABLE 11

| No. | Thickness of alumina film (μm) | Composition (wt %) | Surface state after thermal shock test |
|---|---|---|---|
| 1 | 1.0 | Ti: 0.580 | no abnormality |
| 2 | 2.5 | C: 0.042 | no abnormality |
| 3 | 5.0 | Cr: 19.0 | no abnormality |
| 4 | 8.0 | Si: 0.03 | no abnormality |
| 5 | 10.0 | Mo: 1.00 | no abnormality |
| 6 | 15.0 | Ni: 11.0 | partially peeled |
| 7 | 20.0 | Fe: balance | partially peeled |
| 8 | 1.0 | Ti: 0.600 | no abnormality |
| 9 | 2.5 | C: 0.042 | no abnormality |
| 10 | 5.0 | Cr: 18.0 | no abnormality |
| 11 | 8.0 | Fe: 11.0 | no abnormality |
| 12 | 10.0 | Si: 0.05 | no abnormality |
| 13 | 15.0 | Mn: 0.5 | partially peeled |
| 14 | 20.0 | Al: 1.0 | partially peeled |
| | | Ni: balance | |

It is seen from the results in Table 11 that the thickness of the plated aluminum layer is preferably not less than 10 μm.

Furthermore, substrates made of the stainless steel and the Ni base alloy satisfying the composition ranges in the present invention among the above-mentioned runs were treated at temperatures of 500° to 1,000° C. for various time periods, and their sectional faces were observed through a microscope to examine the heat treating conditions. At that time, the thickness of the plated aluminum layer was 5 μm for all the test substrates. Results are shown in Table 12.

TABLE 12

| No. | Heat treating temperature (°C.) | Heat treating time | Formation of alloy layer | Thickness of alumina film (μm) | Composition (wt %) |
|---|---|---|---|---|---|
| 1 | 500 | 1 hr. | almost not alloyed | — | Ti: 0.580 |
| 2 | 550 | 1 hr. | almost not alloyed | — | C: 0.042 |
| 3 | 550 | 500 hr. | Al layer partially remained | — | Cr: 19.0 |
| 4 | 600 | 5 min. | Al layer partially remained | 0.1 | Si: 0.03 |
| 5 | 600 | 10 min. | all alloyed | 1.0 | Mo: 1.00 |
| 6 | 600 | 1 hr. | all alloyed | 2.0 | Ni: 11.0 |
| 7 | 600 | 1 hr. | all alloyed | 2.0 | Fe: balance |
| 8 | 900 | 10 min. | all alloyed | 2.0 | |
| 9 | 1,000 | 500 hr. | all alloyed | 3.0 | |
| 10 | 1,100 | 1 hr. | alloyed layer partially peeled | 3.0 | |
| 11 | 1,100 | 500 hr. | alloyed layer peeled | — | Ti: 0.600 |
| 12 | 500 | 1 hr. | almost not alloyed | — | C: 0.042 |
| 13 | 550 | 1 hr. | almost not alloyed | — | Cr: 18.0 |
| 14 | 550 | 500 hr. | Al layer partially remained | — | Fe: 11.0 |
| 15 | 600 | 5 min. | Al layer partially remained | 0.2 | Si: 0.05 |
| 16 | 600 | 10 min. | all alloyed | 1.0 | Mn: 0.5 |
| 17 | 600 | 1 hr. | all alloyed | 2.0 | Al: 11.0 |

TABLE 12-continued

| No. | Heat treating temperature (°C.) | Heat treating time | Formation of alloy layer | Thickness of alumina film (μm) | Composition (wt %) |
|---|---|---|---|---|---|
| 18 | 600 | 1 hr. | all alloyed | 2.0 | Ni: balance |
| 19 | 900 | 10 min. | all alloyed | 2.0 | |
| 20 | 1,000 | 500 hr. | all alloyed | 3.0 | |
| 21 | 1,100 | 1 hr. | alloyed layer partially peeled | 3.0 | |
| 22 | 1,100 | 500 hr. | alloyed layer peeled | — | |

As is seen from the results in Table 12, it is necessary that the heat treating conditions required for completing the alloying are 600° to 1,000° C. and not less than 10 minutes.

Among the above test substrates, the substrate made of a stainless steel having a composition of 0.580 wt % of Ti, 0.042 wt % of C, 19.0 wt % of Cr, 0.03 wt % of Si, 1.00 wt % of Mo, 11.0 wt % of Ni, and the balance being Fe was plated with aluminum in a thickness of 5 μm, which was heated at 900° C. for 10 minutes. When analyzed by means of Auger electron spectrogaphy, the thus treated substrate exhibited the composition distribution of FIG. 7. This shows that concentrations of Ti and C are high near the interface between the oxidized surface layer and the alloy layer, and that the Al-O-Ti-C bonds are formed.

Figure 7:
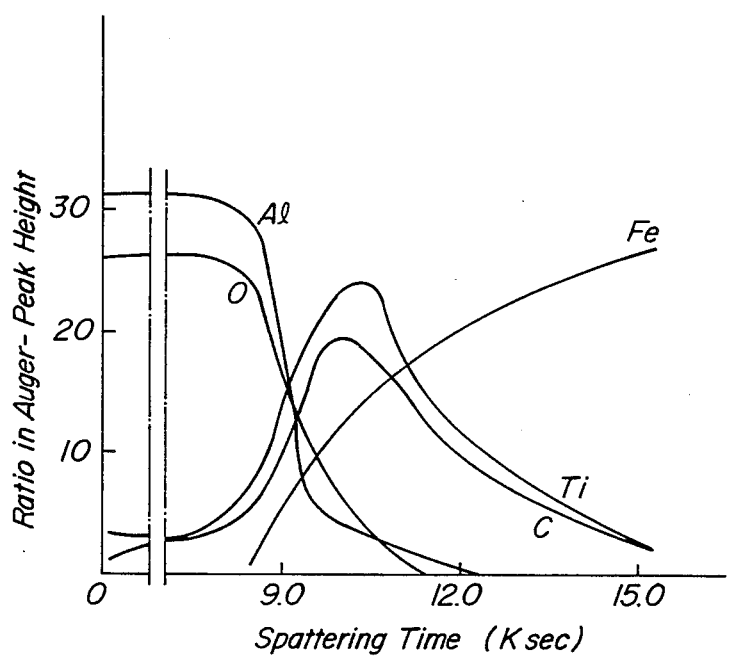
FIG. 7 is a diagram showing results of catalyst carriers according to the second aspect of the present invention.

That is, the ordinate and the abscissa of FIG. 7 denote the Auger peak height on the Y-axis, which corresponds to the concentration, and the spattering time period on the X-axis, which corresponds to the depth, respectively. Although the alumina and the stainless steel are clearly separated at the interface therebetween once the substrates have undergone the heat treatment, it is evident in FIG. 7 that Ti and C have concentrated at the interface and partially entered the alumina film in the case of the substrates having undergone the heat treatment at 900° C. for 10 minutes.

The state of Ti distributed is in conformity with that of C, which shows the formation of TiC. It was also confirmed by X-ray electrospectroscopy that Ti and C, concentrated in the interface, were present in the form of TiC.

As is clear from the foregoing explanation, according to the catalyst carrier and the producing process thereof in the second aspect of the present invention, since the specified amounts of Ti and C are contained in the metal substrate, chemically strong Al-O-Ti-C bonding is formed between the metal substrate and the alumina thin layer. Thus, the alumina thin layer can firmly be bonded to the substrate. Further, the alumina thin layer having equal or higher strength is produced by heat treating the plated aluminum layer without the addition of a certain amount of Al into the substrate unlike the prior art to produce the alumina whiskers. Therefore, the catalyst carrier, which has gas permeability in at least one given direction and which is useful to purify a variety of combustion waste gases, can be obtained by simple steps without deteriorating the plastic deformability.

What is claimed is:

1. A method for producing a catalyst carrier, comprising the steps of: preparing a metal strip from a stainless steel or a nickel base alloy at least containing 0.2 to 0.8 wt % of Ti and 0.01 to 0.5 wt % of C; converting the metal strip to a corrugated porous body having gas permeability in at least one direction; coating the entire surface of the porous body with alumina and; forming an alumina thin layer firmly bonded to the surface of the metal strip via Al-O-Ti-C bonds by heat treating the porous body at 600° to 1,000° C. for not less than 10 minutes.

2. A method for producing a catalyst carrier, comprising the steps of: preparing a metal strip from a stainless steel or a nickel base alloy at least containing 0.2 to 0.8 wt % of Ti and 0.01 to 0.5 wt % of C; coating a surface of the metal strip with alumina; forming an alumina thin layer firmly bonded to gas surface of the metal strip via Al-O-Ti-C bonds by heat treating the porous body at 600° to 1,000° C. for not less than 10 minutes, and converting the heat treated metal strip to a corrugated porous body having the permeability in at least one direction.

3. A method for producing a catalyst carrier, comprising the steps of preparing pipe-like substrates from a stainless steel or a nickel base alloy at least containing 0.2 to 0.8 wt % of Ti and 0.01 to 0.5 wt % of C; coating the entire surfaces of the pipe-like substrates with alumina; forming an alumina thin layer firmly bonded to the surfaces of the coated pipe-like substrates via Al-O-Ti-C bonds by heat treating at 600° to 1,000° C. for not less than 10 minutes and; converting the heat treated pipe-like substrates to a porous body having gas permeability in at least one direction by bundling the pipe-like substrates.

4. A method for producing a catalyst carrier, comprising the steps of:
preparing wire substrate elements from a stainless steel or a nickel base alloy at least containing 0.2 to 0.8 wt % of Ti and 0.01 to 0.5 wt % of C; obtaining a substrate that is either a knitted substrate produced by knitting the wire substrate elements or a wire substrate produced by twisting the wire substrate elements; coating the entire surface of the knitted substrate or the wire substrate with alumina; forming an alumina thin layer firmly bonded to the surface of the knitted substrate or the twisted substrate via Al-O-Ti-C bonds by heat treating the substrate at 600° to 1000° C. for 10 minutes; and shaping the knitted substrate or the wire substrate into the form of a porous body having gas permeability in at least one direction.

5. A method for producing a catalyst carrier, comprising the steps of: preparing a metal strip from a stainless steel or a nickel base alloy at least containing 0.2 to 0.8 wt % Ti and 0.01 to 0.5 wt % C; plating a surface of the metal strip with aluminum; cold rolling the plated metal strip; converting the cold rolled metal strip to a corrugated porous body having gas permeability in at least one direction; and forming an alumina thin layer firmly bonded by Al-O-Ti-C bonds onto the surface of the porous body, made of the metal strip having an aluminum-iron compound or an aluminum-nickel alloy, by heat treating the porous body at 600° to 1,000° C. for not less than 10 minutes, the plated aluminum layer being oxidized to form the alumina thin layer by the heat treatment.

6. A catalyst carrier comprising:
a substrate made of a material selected from the group consisting of:
(a) a stainless steel consisting essentially of:
0.2 to 0.8 wt % Ti;
0.01 to 0.5 wt % C;
10 to 26 wt % Cr;
at least one additive element selected from the group consisting of 0 to 30 wt % Ni, 0 to 10 wt % Mn, 0 to 6 wt % Mo, 0 to 5 wt % V, 0 to 5 wt % Co, 0 to 3 wt % Al, 0 to 5 wt % Si, 0 to 3 wt % Cu, 0 to 3 wt % Be, 0 to 1 wt % Zr, 0 to 3 wt % Y and 0 to 3 wt % Ce; and the balance being Fe; and
(b) a nickel base alloy containing at least 0.2 to 0.8 wt % Ti and 0.01 to 0.5 wt % C; and
an alumina thin layer firmly bonded onto a surface of the substrate by Al-O-Ti-C bonds;
wherein said catalyst carrier is a porous body having gas permeability in at least one direction.

7. The catalyst carrier of claim 6, wherein a thickness of the alumina thin layer ranges from 0.1 to 5.0 μm.

8. The catalyst carrier of claim 6, wherein the stainless steel is selected from the group consisting of:
a stainless steel consisting essentially of: 0.4 to 0.7 wt % Ti; 18 to 20 wt % Cr; not more than 2.00 wt % Mn; 0.015 to 0.15 wt % C; not more than 1.00 wt % Si; 9.0 to 13.0 wt % Ni; and the balance being Fe;
a stainless steel consisting essentially of: 0.4 to 0.7 wt % Ti; 16 to 18 wt % Cr; not more than 2.00 wt % Mn; 2.0 to 3.0 wt % Mo; 0.015 to 0.15 wt % C; not more than 1.00 wt % Si; 12.0 to 15.0 wt % Ni; and the balance being Fe;
a stainless steel consisting of: 0.4 to 0.7 wt % Ti; 17 to 19 wt % Cr; not more than 2.00 wt % Mn; 0.015 to 0.15 wt % C; not more than 1.00 wt % Si; 9.0 to 13.0 wt % Ni; and the balance being Fe;
a stainless steel consisting essentially of: 0.4 to 0.7 wt % Ti; 11.5 to 13.5 wt % Cr; not more than 1.00 wt % Mn; 0.015 to 0.15 wt % C; not more than 1.00 wt % Si; and the balance being Fe;
a stainless steel consisting essentially of: 0.4 to 0.7 wt % Ti; 11.5 to 14.5 wt % Cr; 0.1 to 0.3 wt % Al; 0.015 to 0.15 wt % C; not more than 1.00 wt % Mn; and the balance being Fe; and
a stainless steel consisting essentially of: 0.4 to 0.7 wt % Ti; 13 to 18 wt % Cr; 0.015 to 0.15 wt % C; and the balance being Fe.

9. The catalyst carrier of claim 6, wherein the Ni base alloy consists essentially of: 0.2 to 0.8 wt % Ti; 0.01 to 0.5 wt % C; 20 to 65 wt % Cr+Fe+Mo in a total amount; 0 to 10 wt % Mn; 0 to 5 wt % V; 0 to 5 wt % Co; 0 to 3 wt % Al; 0 to 3 wt % Cu; 0 to 3 wt % Be; 0 to 1 wt % Zr; 0 to 3 wt % Y; 0 to 3 wt % Ce; and the balance being Ni.

10. The catalyst carrier of claim 6, wherein the Ni base alloy is selected from the group consisting of:
a Ni base alloy consisting essentially of: 0.4 to 0.7 wt % Ti; 15 to 23 wt % Cr; not more than 1.00 wt % Si; not more than 1.50 wt % Al; 0.015 to 0.15 wt % C; 8 to 15 wt % Fe; not more than 1.00 wt % Mn; and the balance being Ni;
a Ni base alloy consisting essentially of: 0.4 to 0.7 wt % Ti; 48 to 62 wt % Cr; not more than 1.00 wt % Mn; 0.015 to 0.15 wt % C; not more than 1.00 wt % Si; 9.0 to 13.0 wt % Fe; and the balance being Ni;
a Ni base alloy consisting essentially of: 0.4 to 0.7 wt % Ti; not more than 1.00 wt % Cr; not more than 1.00 wt % Mn; 26 to 30 wt % Mo; 0.015 to 0.15 wt % C; not more than 1.00 wt % Si; 3.0 to 6.0 wt % Fe; and the balance being Ni;
a Ni base alloy consisting essentially of: 0.4 to 0.7 wt % Ti; 14.5 to 16.5 wt % Cr; not more than 1.00 wt % Mn; not more than 2.5 wt % Co; 0.015 to 0.15 wt % C; not more than 1.00 wt % Si; 4.0 to 7.0 wt % Fe; 15 to 18 wt % Mo, and the balance being Ni; and
a Ni base alloy consisting essentially of: 0.4 to 0.7 wt % Ti; 0.015 to 0.15 wt % C; and the balance being Ni.

11. The catalyst carrier of claim 6, wherein the porous body has a structure selected from the group consisting of a corrugated structure, a pipe-bundled structure and a wire-twisted structure.

12. A catalyst carrier comprising:
a substrate made of a material selected from the group consisting of:
(a) a stainless steel consisting essentially of:
0.2 to 0.8 wt % Ti;
0.01 to 0.5 wt % C;
10 to 26 wt % Cr;
at least one additive element selected from the group consisting of 0 to 30 wt % Ni, 0 to 10 wt % Mn, 0 to 6 wt % Mo, 0 to 5 wt % V, 0 to 5 wt % Co, 0 to 3 wt % Al, 0 to 5 wt % Si, 0 to 3 wt % Cu, 0 to 3 wt % Be, 0 to 1 wt % Zr, 0 to 3 wt % Y and 0 to 3 wt % Ce; and the balance being Fe; and
(b) a nickel base alloy containing at least 0.2 to 0.8 wt % Ti and 0.01 to 0.5 wt % C;
an intermediate layer bonded onto a surface of the substrate, said intermediate layer consisting of either an aluminum-iron alloy or an aluminum-nickel alloy; and
an alumina thin layer firmly bonded by Al-O-Ti-C bonding onto said intermediate layer;
wherein said catalyst carrier is a porous body having gas permeability in at least one direction.

13. The catalyst carrier of claim 12, wherein a thickness of the alumina thin layer ranges from 0.1 to 0.5 μm.

14. The catalyst carrier of claim 12, wherein the stainless steel is selected from the group consisting of:
a stainless steel consisting of: 0.4 to 0.7 wt % Ti; 18 to 20 wt % Cr; not more than 2.00 wt % Mn; 0.015 to 0.15 wt % C; not more than 1.00 wt % Si; 9.0 to 13.0 wt % Ni; and the balance being Fe;
a stainless steel consisting essentially of: 0.4 to 0.7 wt % Ti; 16 to 18 wt % Cr; not more than 2.00 wt % Mn; 2.0 to 3.0 wt % Mo; 0.015 to 0.15 wt % C; not more than 1.00 wt % Si; 12.0 to 15.0 wt % Ni; and the balance being Fe;
a stainless steel consisting essentially of: 0.4 to 0.7 wt % Ti; 17 to 19 wt % Cr; not more than 2.00 wt % Mn; 0.015 to 0.15 wt % C; not more than 1.00 wt % Si; 9.0 to 13.0 wt % Ni; and the balance being Fe;
a stainless steel consisting of: 0.4 to 0.7 wt % Ti; 11.5 to 13.5 wt % Cr; not more than 1.00 wt % Mn; 0.015 to 0.15 wt % C; not more than 1.00 wt % Si; and the balance being Fe;
a stainless steel consisting essentially of: 0.4 to 0.7 wt % Ti; 11.5 to 14.5 wt % Cr; 0.1 to 0.3 wt % Al; 0.015 to 0.15 wt % C; not more than 1.00 wt % Mn; and the balance being Fe; and a stainless steel consisting essentially of: 0.4 to 0.7 wt % Ti; 13 to 18 wt % Cr; 0.015 to 0.15 wt % C; and the balance being Fe.

15. The catalyst carrier of claim 12, wherein the Ni base alloy consists essentially of: 0.2 to 0.8 wt % Ti; 0.01 to 0.5 wt % C; 20 to 65 wt % Cr+Fe+Mo in a total amount; 0 to 10 wt % Mn; 0 to 5 wt % Si; 0 to 5 wt % V; 0 to 5 wt % Co; 0 to 3 wt % Al; 0 to 3 wt % Cu; 0 to 3 wt % Be; 0 to 1 wt % Zr; 0 to 3 wt % Y; 0 to 3 wt % Ce; and the balance being Ni.

16. The catalyst carrier of claim 12, wherein the Ni base alloy is selected from the group consisting of:

a Ni base alloy consisting essentially of: 0.4 to 0.7 wt % Ti; 15 to 23 wt % Cr; not more than 1.00 wt % Si; not more than 1.50 wt % Al; 0.015 to 0.15 wt % C; 8 to 15 wt % Fe; not more than 1.00 wt % Mn; and the balance being Ni;

a Ni base alloy consisting essentially of: 0.4 to 0.7 wt % Ti; 48 to 62 wt % Cr; not more than 1.00 wt % Mn; 0.015 to 0.15 wt % C; not more than 1.00 wt % Si; 9.0 to 13.0 wt % Fe; and the balance being Ni;

a Ni base alloy consisting essentially of: 0.4 to 0.7 wt % Ti; not more than 1.00 wt % Cr; not more than 1.00 wt % Mn; 26 to 30 wt % Mo; 0.015 to 0.15 wt % C; not more than 1.00 wt % Si; 3.0 to 6.0 wt % Fe; and the balance being Ni;

a Ni base alloy consisting essentially of: 0.4 to 0.7 wt % Ti; 14.5 to 16.5 wt % Cr; not more than 1.00 wt % Mn; not more than 2.5 wt % Co; 0.015 to 0.15 wt % C; not more than 1.00 wt % Si; 4.0 to 7.0 wt % Mo; and the balance being Ni; and a Ni base alloy consisting essentially of: 0.4 to 0.7 wt % Ti; 0.015 to 0.15 wt % C; and the balance being Ni.

17. The catalyst carrier of claim 12 wherein the porous body has a structure selected from the group consisting of a corrugated structure, a pipe-bundled structure and a wire-twisted structure.

18. The catalyst carrier of claim 6, wherein said substrate material consists of said stainless steel.

19. The catalyst carrier of claim 6, wherein said substrate material consists of said nickel base alloy.

20. The catalyst carrier of claim 12, wherein said substrate material consists of said stainless steel.

21. The catalyst carrier of claim 12, wherein said substrate material consists of said nickel base alloy.

* * * * *